Dec. 6, 1949            H. D. VIA            2,490,721

SALT SHAKER

Filed March 14, 1947

HUGH D. VIA, Inventor

By McMorrow, Berman + Davidson
Attorneys

Patented Dec. 6, 1949

2,490,721

UNITED STATES PATENT OFFICE 2,490,721

SALT SHAKER

Hugh D. Via, Portsmouth, Va.

Application March 14, 1947, Serial No. 734,615

1 Claim. (Cl. 65—57)

This invention relates to a container for holding and dispensing salt, granulated sugar, pepper, bicarbonate of soda, and other substances in powdered, granulated, or comminuted form.

A principal object of the invention is to provide such a container that will always permit the contents to run freely and controllably, irrespective of conditions tending to cause clogging or lumping.

Another object of the invention is to provide such a container that will be economical to manufacture and easy to operate.

Another object of the invention is to provide a container of the character described that will be easy to refill.

Other objects will hereinafter more clearly appear in the detailed description, taken in conjunction with the annexed drawing.

The invention will be described with particular reference to a salt shaker, although it is to be understood that other foods, condiments, and drugs may be similarly held and dispensed.

Figure 1:
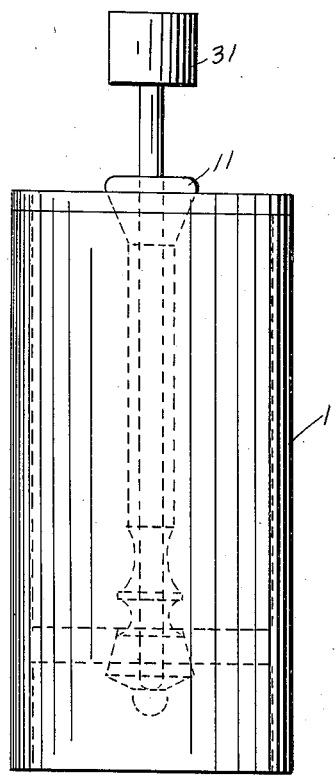
Figure 1 is a front elevation of the new and improved shaker.
Figure 2:
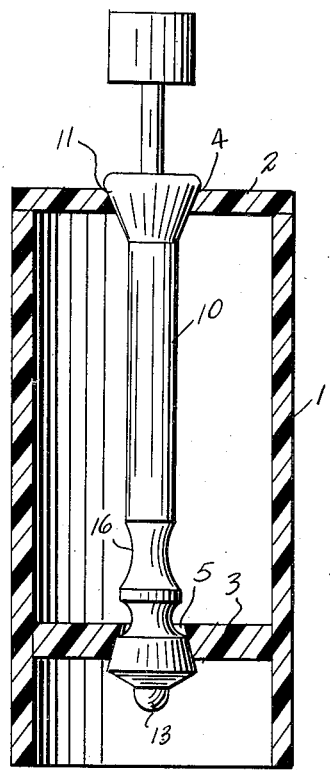
Figure 2 is a vertical section through the shaker, with the object of showing the construction and arrangement of the internal plunger and the plug portions thereof.
Figure 3:
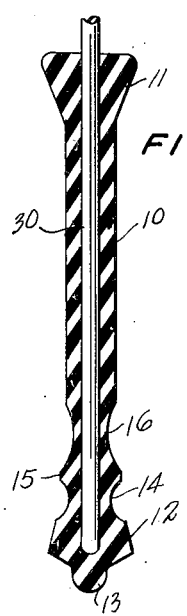
Figure 3 is a vertical section through the plunger.

The invention comprises a main cylindrical container 1 having a top 2 and a bottom closure 3, the latter being spaced some distance above the bottom of the container 1. The top member 2 is provided with a central aperture 4, and the lower member 3 is also provided with a central aperture 5. When the apertures 4 and 5 are sealed, the container 1 will form an air-tight compartment for the salt or other contents. The apertures 4 and 5 are tapered, the taper of the aperture 4 converging downwardly, and the taper of the aperture 5 converging upwardly when the container 1 is in the upright position shown in Figure 2.

A plunger 10, made of rubber, is adapted to slide axially within the container 1 to dispense the salt as required. The upper portion of the plunger 10 is provided with a conical portion 11 that is adapted to mate with and form a plug for the aperture 4 in the top 2 of the container. The size of the conical plug portion 11 will be such as to form a tight closure for the aperture 4, in the nature of a force fit. The other end of the plunger 10 will have another conical portion 12 serving as a second plug adapted to fit within the aperture 5 of the bottom member 3 in such a way as to provide a slide fit. In the normal position of the plunger 10, the lower aperture 5 will be closed by the conical portion 12 of the plunger 10, so that the contents of the container 1 are held above the bottom member 3. The aperture 5 is smaller than the aperture 4 in order to permit assembly of the plunger 10 within the container 1. The plunger 10 ends in a tip 13 below the conical portion 12.

Above the second conical plug portion 12, is an enlarged annular corrugation 14, of a diameter smaller than that of the conical plug portion 12. Above the corrugation 14 is an annular protuberance or check ring 15, and above the check ring 15 is another annular corrugation 16, for a purpose to be described more fully hereinafter.

The plunger 10 is longitudinally apertured and is adapted to receive a comparatively rigid rod 30. The end of the rod 30 is firmly embedded in the lower conical plug portion 12 of the rubber plunger 10. The upper portion of the rod 30 has some movement relative to its adjoining portion of the plunger 10. An operating button 31 is fixed to the upper end of the rod 30.

To assemble the device, the plunger 10 is inserted through the aperture 4 of the container 1, the tip 13 serving as a guide. The conical plug portion 12 of the plunger 10 will have to be forced through the aperture 5 of the lower closure member 3 in order to attain the position shown in Figure 2 of the drawing, and to this end the tip 13 may be manually grasped from the bottom of the container and pulled until the conical portion 12 has cleared the aperture 5. The size and resilience of the member 12 are such as to normally keep the conical plug portion 12 in close contact with the closure member 3 to lock the contents within the container 1 and to form an air-tight seal therefor.

To dispense the salt, it is only necessary to depress the operating button 31 with respect to the container 1. As soon as the conical plug portion 12 has moved downwardly a sufficient distance to clear the aperture 5 of the closure member 3 by the downward stretching of plunger 10, the salt will start to flow. It should be observed that it is not necessary to have the conical plug member 12 entirely below the closure member 3, and that it is merely sufficient to have it lowered only such a distance as will permit the salt to fall down between the sides of the conical plug portion 12 and the aperture 5. The annular corrugation 14 serves as a portion measuring section on the plunger. After the salt immediately contiguous to the opening 5 has fallen through from about corrugation 14, the ring 15 will tend to stop any further flow. The button 31 will then be released, thereby urging the bottom portion of the plunger 10 upwardly and displacing some of the salt toward the bottom of the container. The button 31 can again be depressed to dispense some of the contents. The operation is repeated as long and as often as desired.

Figure 4:
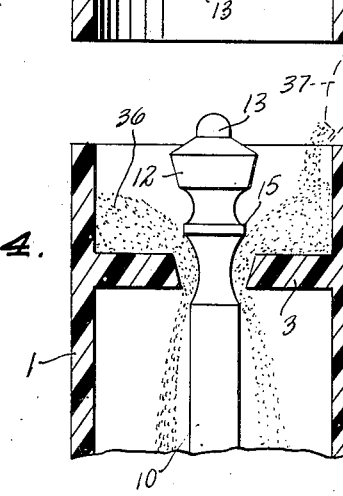
Figure 4 is a vertical section through the shaker in reverse position, showing the plunger during the refilling operation.

To refill the container, it is necessary to invert the device, as shown in Figure 4. If the button 31 is positioned on a table, the container 1 can be pushed downwardly to force the conical portion 12 away from the closure member 3. The relative movement of the plunger 10 and the container 1 is such as to pass the entire conical plug portion 12, the corrugation 14, and the ring member 15 away from the bottom closure member 3. The ring portion 15, of course, is smaller in diameter than any diameter of the aperture 5 so that the ring section 15 can pass the aperture 5 without difficulty. When the corrugation 16 is within the aperture 5, as shown more particularly in Figure 4, salt 36 can be deposited by a spoon 37 or other implement, and the salt will pass easily through the aperture 5 into the container 1.

What I claim is:

In a salt shaker comprising a hollow container with a central aperture in both the top and bottom thereof, both apertures being conical, and a plunger extending through the container and having conical plug portions at the ends thereof adapted to fit the conical apertures in the top and bottom of the container, the features which include a rod extending from within the lower end of the plunger upwardly through the upper end of the latter, an operating button disposed on the upper end of the rod, and include having the plunger consist of resilient rubber so that the lower plug portion may be depressed by pressure applied to the operating button by stretching the plunger and increasing the distance between the two conical plug portions thereon, having the upper conical aperture flaring upwardly and the lower conical aperture flaring downwardly, and the upper conical plug portion on the plunger diverging or flaring upwardly and the lower conical plug portion flaring or diverging downwardly.

HUGH D. VIA.

REFERENCES CITED

The following references are of record in the file of this patent:

UNITED STATES PATENTS

| Number | Name | Date |
| --- | --- | --- |
| 59,406 | Keep | Nov. 6, 1866 |
| 453,956 | Beazley | June 9, 1891 |
| 580,602 | Jacobs | Apr. 13, 1897 |
| 1,295,665 | Younger | Feb. 25, 1919 |
| 1,337,789 | Nicholas | Apr. 20, 1920 |
| 1,366,929 | Pasnik | Feb. 1, 1921 |
| 1,491,529 | Haeseler | Apr. 22, 1924 |
| 1,547,953 | Palmer | July 28, 1925 |
| 1,588,552 | Sprinkle | June 15, 1926 |
| 1,772,041 | Harris | Aug. 5, 1930 |
| 2,427,380 | Benoit | Sept. 16, 1947 |